Oct. 10, 1961     E. G. CHARTIER ET AL     3,004,179
ELECTRIC CLOCK

Filed Oct. 7, 1957                            6 Sheets-Sheet 1

INVENTORS
EDMUND G. CHARTIER and
CHESTER W. WICKENBERG

George R. Clark
ATTORNEY

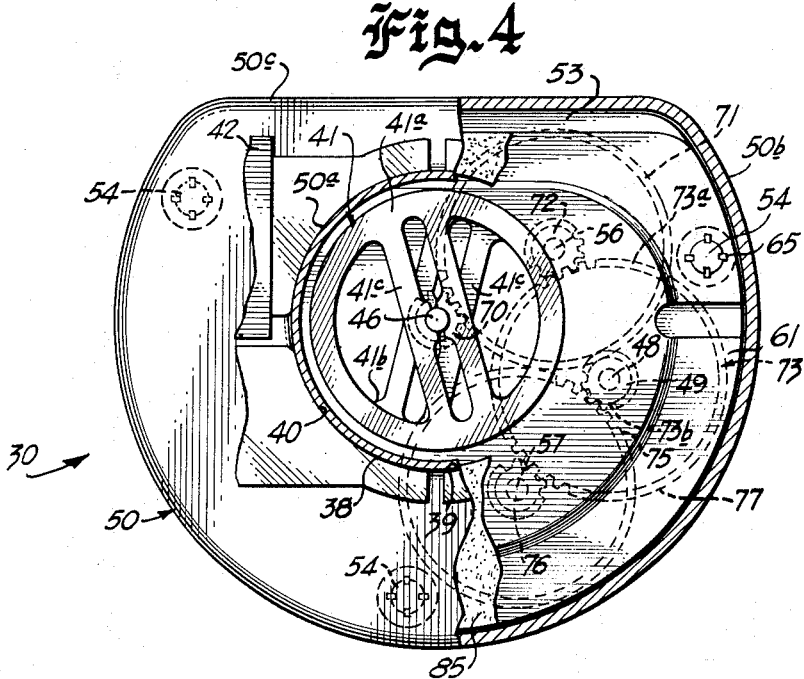
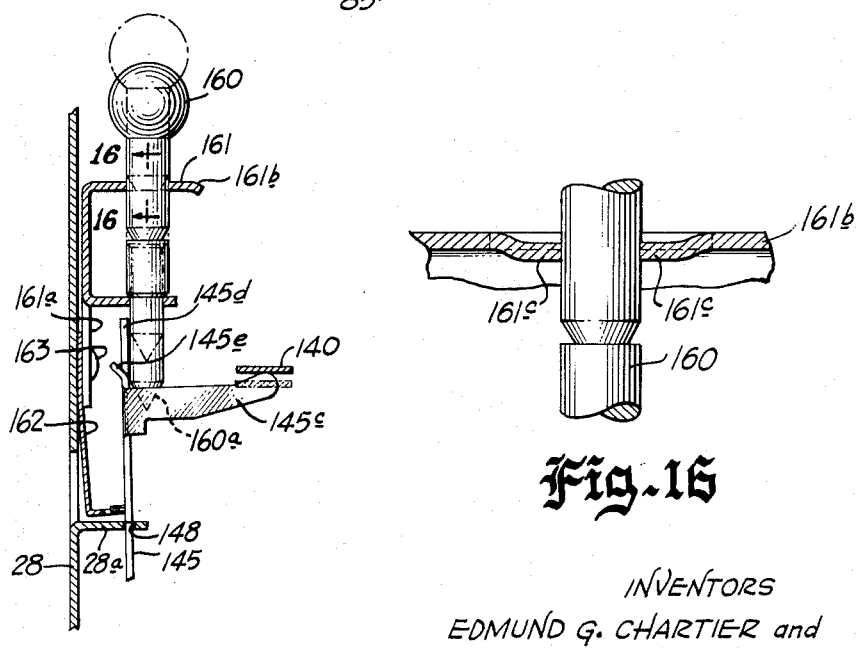
INVENTORS
EDMUND G. CHARTIER and
CHESTER W. WICKENBERG
George R. Clark
ATTORNEY

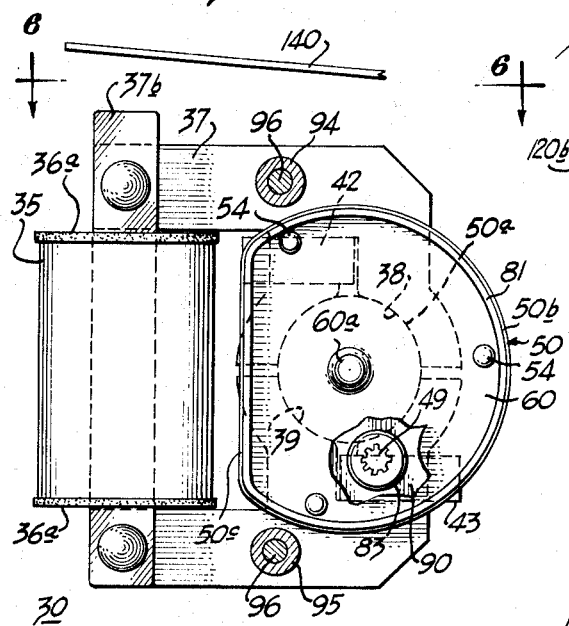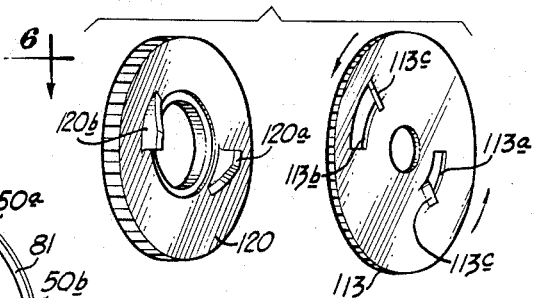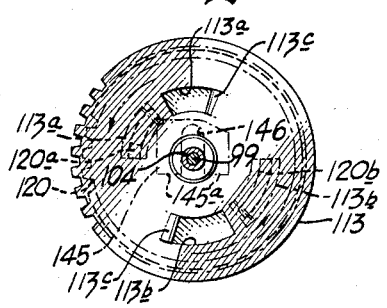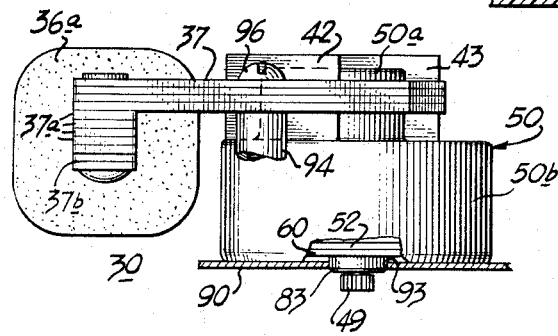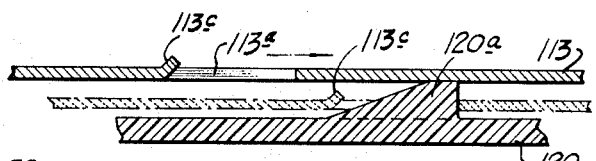
INVENTORS
EDMUND G. CHARTIER and
CHESTER W. WICKENBERG
George R. Clark
ATTORNEY

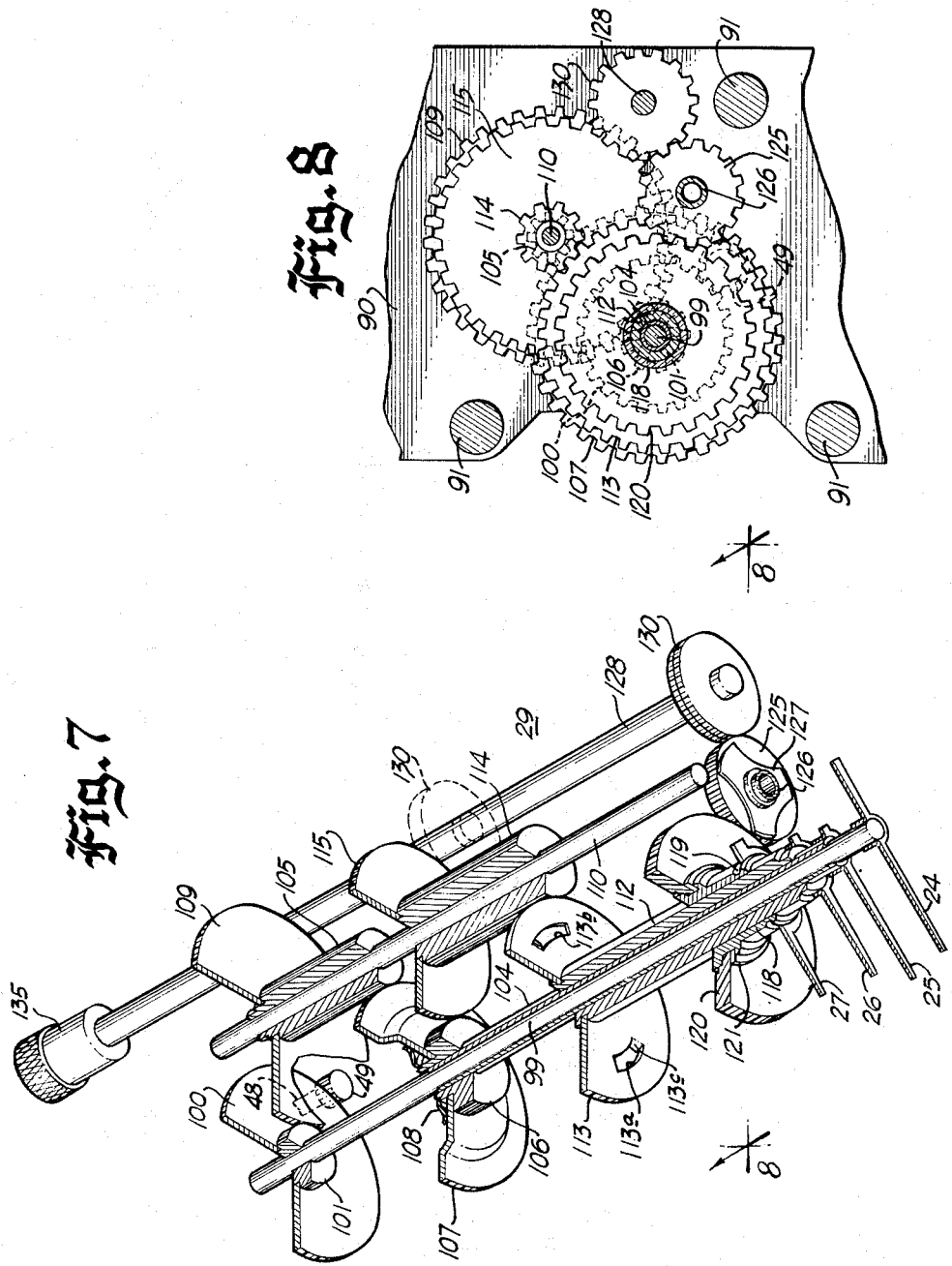

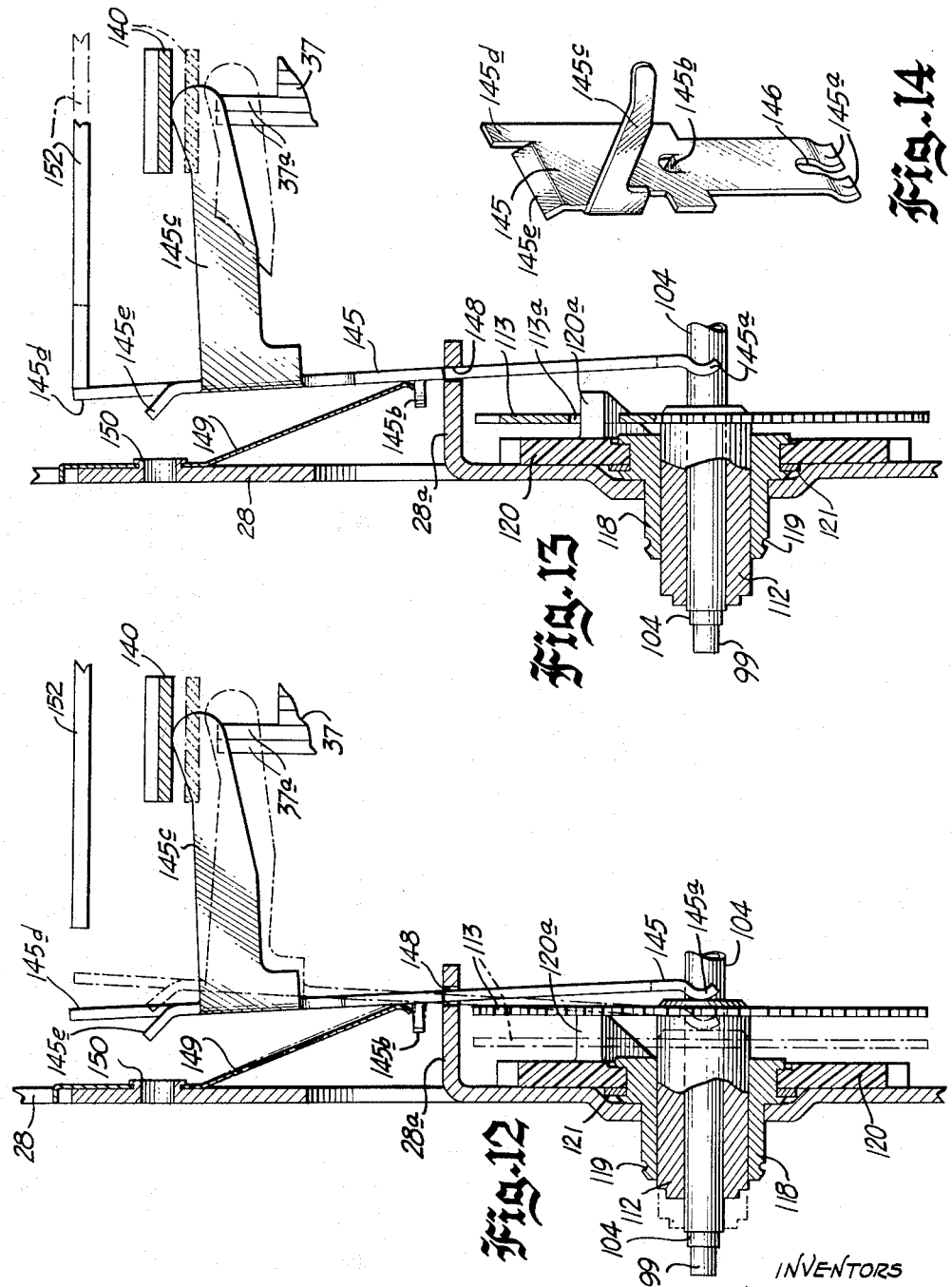

United States Patent Office 3,004,179
Patented Oct. 10, 1961

3,004,179
ELECTRIC CLOCK
Edmund G. Chartier, Elmhurst, and Chester H. Wickenberg, Elgin, Ill., assignors to Sunbeam Corporation, Chicago, Ill., a corporation of Illinois
Filed Oct. 7, 1957, Ser. No. 688,467
12 Claims. (Cl. 310—83)

The present invention relates to electric clocks, and, more particularly, to an improved alarm clock and an improved electric motor for the same.

By virtue of the almost universal existence of commercially available alternating current power, particularly in the United States, there is provided a ready means of accurate time keeping based upon the fact that commercially available alternating current power has a frequency which is kept constant by means of suitable master frequency control means. Consequently, electric clocks have been and are extensively employed. There have been developed for such electric clocks simple synchronous motors which provide a constant speed output for use to drive any clock mechanism. Such electric motors for driving clocks must be sold on a high production, low-cost basis, and it would be desirable to provide an improved electric motor which can be manufactured inexpensively and on a production line basis and still in a manner to provide a very accurate and satisfactory device. It would furthermore be desirable to provide such an electric motor having substantially higher torque than the prior art motors without increasing the size thereof, and, in fact, actually reducing the size. It would, moreover, be desirable to provide such a motor with the simplest gear mechanism possible.

One common form of electric clock is what is generally referred to as an alarm clock, namely, a clock provided with means which permits actuating an audible alarm at any predetermined time. It has been common practice heretofore in electric alarm clocks to utilize the magnetic structure of the electric motor for driving the clock mechanism and as the magnetic structure of an electric vibrator. It would be desirable to provide an improved mechanism for an electric alarm clock in which a single setting device may be used for setting both the time of the clock and the alarm setting. It would also be desirable to provide a simplified mechanism in which the hour gear which is employed in connection with electric clocks may be used as a part of an alarm control mechanism. Moreover, it would be desirable to provide in an alarm clock a shut-off mechanism which can readily be adapted for use to shut off the alarm with a top shut-off mechanism or with a back shut-off mechanism.

Accordingly, it is an object of the present invention to provide a new and improved motor for an electric clock.

It is another object of the present invention to provide a new and improved electric clock.

Still another object of the present invention is to provide a new and improved electric alarm clock.

It is a further object of the present invention to provide an improved electric alarm clock in which a single set control may be employed for both time setting and alarm setting.

It is a further object of the present invention to provide an improved alarm clock in which an alarm cam concentric with the hour shaft cooperates with the conventional hour gear, which latter also functions as a cam member, thus eliminating a separate cam member for cooperating with the alarm cam.

Still another object of the present invention resides in the provision of an electric alarm clock with an alarm lever which can readily be operated by a top shut-off mechanism or a back shut-off mechanism.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 4 is a view of the housing for the rotor and gear mechanism of the electric motor looking in the direction of the arrows 4—4 of FIG. 3 with certain portions of the housing cut away to show the end of the rotor and some of the gear mechanism;

FIG. 5 is a view of the electric clock motor of the present invention taken on line 5—5 of FIG. 2, but showing a portion of the alarm mechanism and part of the plate from which the motor is supported;

FIG. 6 is a view taken on line 6—6 of FIG. 5;

FIG. 7 is an exploded perspective and somewhat schematic view of the time and alarm gear mechanism, more clearly to disclose the operation thereof;

FIG. 8 is a fragmentary sectional view taken along line 8—8 of FIG. 7, assuming that FIG. 7 includes all the structure of FIG. 3;

FIG. 9 is an exploded perspective view of the alarm cam and hour gear which cooperate to control the alarm mechanism;

FIG. 10 is an end view of the cam and gear of FIG. 9 taken substantially on line 10—10 of FIG. 3, showing how the alarm cam cooperates with the female cam provided on the hour gear, two different positions of the hour gear being shown;

FIG. 11 is a developmental view, greatly enlarged, showing how the alarm cam and hour gear of FIGS. 9 and 10 perform their alarm controlling function;

FIG. 12 is a greatly enlarged fragmentary sectional view of a portion of FIG. 2 illustrating the alarm control mechanism with the manual control in the "alarm-on" position, but the automatic control for the alarm shown in both the position where the alarm is not actuated and where the alarm is actuated;

FIG. 13 is a view similar to FIG. 12 showing the manual control in the "alarm-off" position, but with the automatic control for the alarm in the position where the alarm would be actuated if the manual control were in the "alarm-on" position;

FIG. 14 is a perspective view of a portion of the alarm control mechanism shown in FIGS. 12 and 13 of the drawings;

FIG. 15 is a fragmentary view similar to FIGS. 12 and 13 showing a modification of the present invention; and FIG. 16 is a greatly enlarged fragmentary view taken on line 16—16 of FIG. 15.

Figure 1:
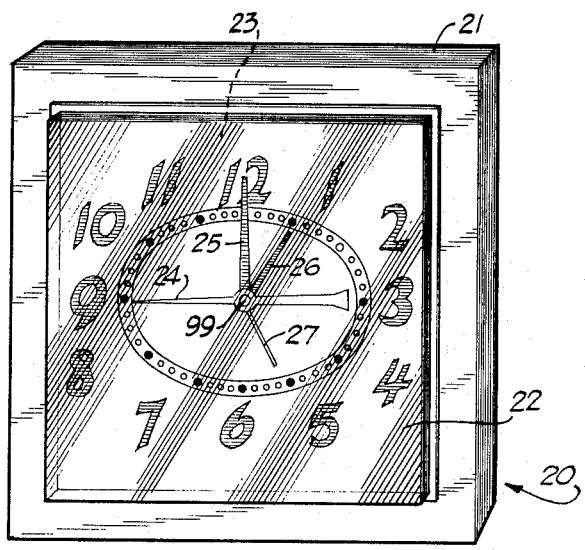
FIG. 1 is a perspective view of an electric alarm clock embodying the present invention.

Referring now to the drawings, there is illustrated in FIG. 1 an electric clock generally indicated at 20, comprising a suitable casing 21, the front of which comprises a transparent plate 22 so as readily to expose to view a clock face 23 of conventional construction. Disposed between the transparent front 22 and the clock face 23 are the conventional sweep second hand 24, the minute hand 25, the hour hand 26, and an alarm indicator 27, these elements 24, 25, 26 and 27 being rotatable about a common axis and supported on an arrangement of concentric shafts.

The electric clock 20 disclosed in FIG. 1 insofar as the appearance or design thereof is concerned forms no part of the present invention and is included merely for the sake of a complete disclosure. Essentially, the invention is concerned with an improved electric motor, clock drive mechanism, alarm mechanism, and control for such alarm mechanism, and is adapted for use in connection with any clock face regardless of size, shape or design. It should be appreciated, therefore, that the various supporting plates shown hereinafter for the gear mechanism are by way of example only and would vary in dependence upon the particular design of the clock. However, the electric motor, the functional parts of the clock gear mechanism and the alarm mechanism would be the same regardless of the shape of the clock casing or design thereof.

Figure 2:
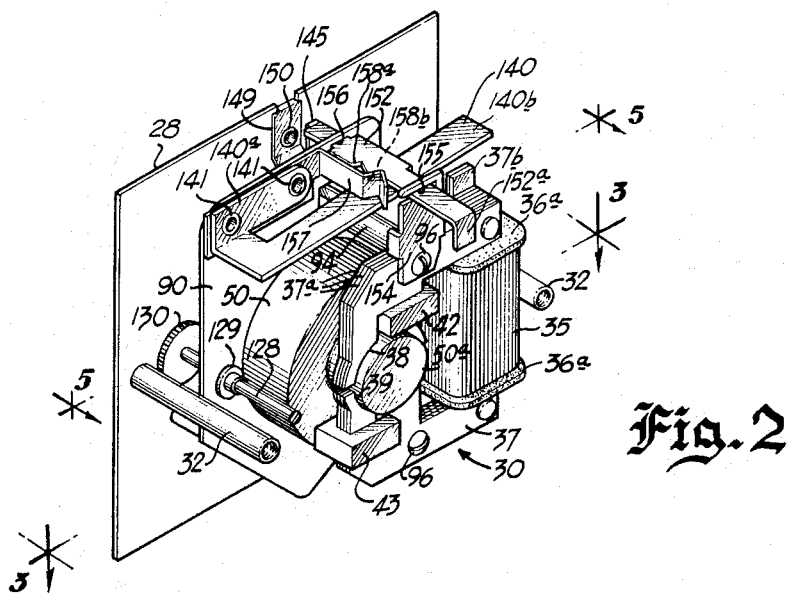
FIG. 2 is a perspective view from the rear of the alarm clock of FIG. 1 with the housing or casing thereof removed so as to show the electric motor and audible signal device.
Figure 3:
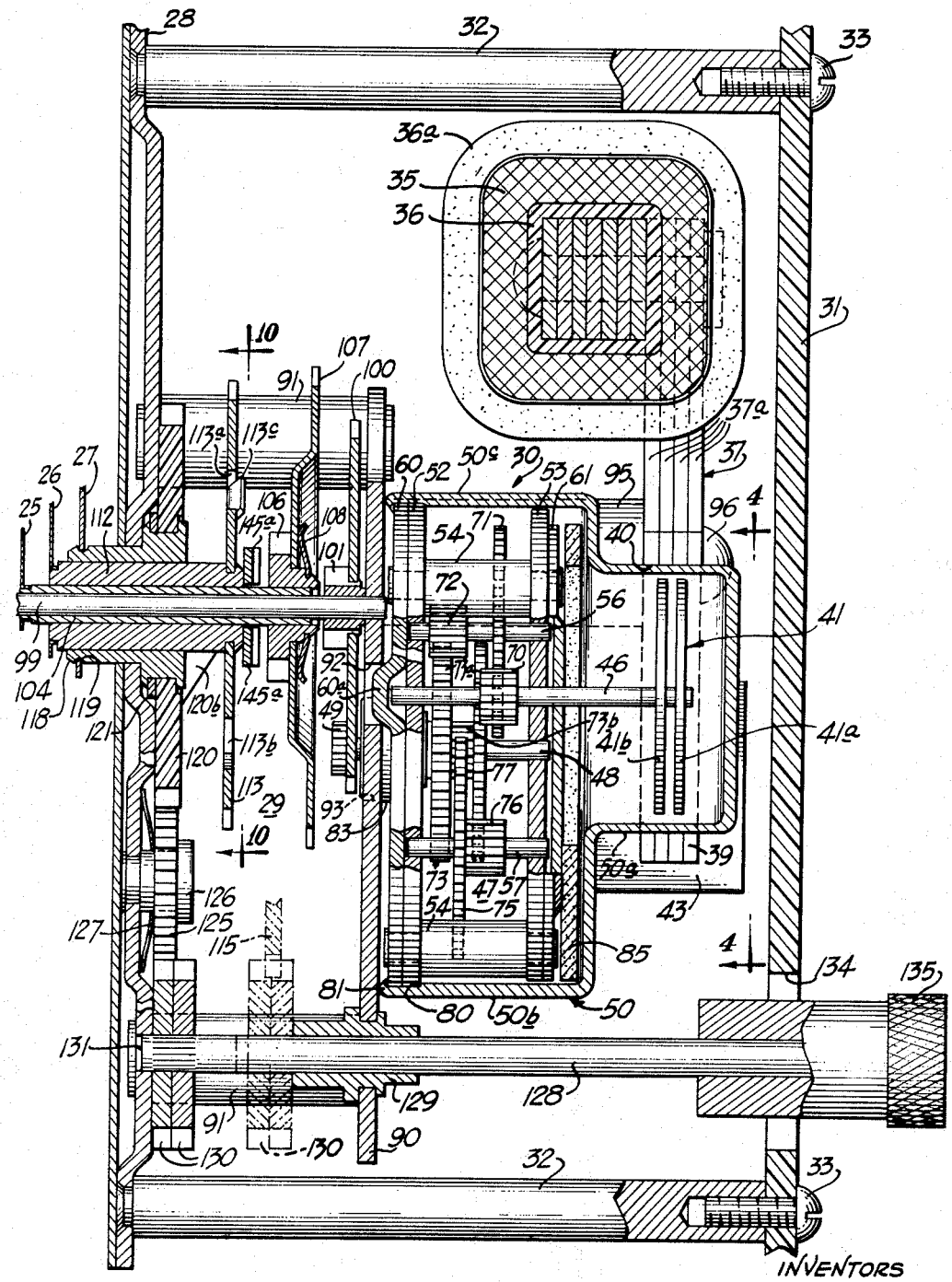
FIG. 3 is a greatly enlarged sectional view taken on line 3—3 of FIG. 2 with certain parts cut away and with the position of the hands of the clock changed.

Referring now to FIGS. 2 and 3 of the drawings, there is illustrated what might be considered the operating mechanism of the electric clock 20, which includes a front plate 28 from which is supported a combined clock and alarm mechanism generally indicated at 29, and an electric motor generally indicated at 30. A suitable back plate 31 may be disposed in spaced parallel relationship with the front plate 28 by means of suitable spacing studs 32 which are indicated as being riveted or otherwise secured to the front plate 28. Suitable screws 33 secure the back plate 31 to the studs 32 and permit ready removal of the back plate 31 to afford access to the clock mechanism within the casing 21.

Considering now, first, the electric motor 30, best shown in FIGS. 2, 3, 4, 5 and 6 of the drawings, it is illustrated as a self-starting synchronous motor of a relatively simple and inexpensive type. As illustrated, the electric motor 30 comprises a single-phase, shaded-pole motor of the synchronous type having a single-phase energizing winding 35. This winding 35 is suitably wound upon an insulating bobbin 36 having end members 36a. The bobbin 36 and the winding 35 surround one leg of a rectangular core 37 comprising a plurality of laminations 37a. This laminated core 37 on the leg thereof opposite that encompassed by the winding 35 and bobbin 36 terminates in a pair of pole faces 38 and 39, each of which is divided or split into two sections. The pole faces 38 and 39 are of curved configuration so as to define a circular opening 40 therebetween for receiving therein a suitable rotor or motor armature generally designated at 41. The pole faces 38 and 39 are each divided into two sections by splitting the pole piece which terminates in these pole faces. A shading coil 42 is provided on one half of the pole piece terminating in the pole face 39, while a shading coil 43 is provided around the other half of the pole piece terminating in the pole face 39. It will be appreciated that by virtue of the shading coils 42 and 43 shading a portion of the flux in each pole piece the alternating current flux in the laminated core 37 is changed into a flux having a rotating component directed through the rotor or armature 41. It will be appreciated that the shaded-pole motor described above is effectively a two-pole motor with a synchronous rotor speed of 3600 revolutions per minute.

With a conventional electric clock it is usually desirable to have a sweep second hand which makes one revolution per minute. Consequently, the output of synchronous motor 30 should have a speed considerably reduced from 3600 revolutions per minute, preferably within the range of one to thirty revolutions per minute so that with a single gear connection a sweep second hand may be driven directly therefrom at one revolution per minute. To this end there is provided a rotor shaft 46 to which is secured the rotor 41 in a manner described hereinafter. The rotor shaft 46 is drivingly connected by means of a suitable gear train generally designated at 47 to an output shaft 48 having an output gear 49 which may be drivingly connected to any suitable mechanism, preferably an electric clock mechanism or the like.

For the purpose of insuring long life and completely protecting the rotor 41, the rotor shaft 46, and the gear train 47 including the output shaft 48, there is preferably provided a completely sealed rotor and gear housing generally designated at 50. This housing is preferably formed of nonmagnetic material such as aluminum or the like so as not to affect the magnetic flux passing between the pole faces 38 and 39 of the magnetic structure 37 and through the rotor 41. As illustrated, the housing 50 comprises a first bosslike circular section 50a having an exterior diameter so as snugly to fit within the circular opening 40 defined between the pole faces 38 and 39 of the magnetic structure 37. The housing further includes a main section 50b which has a flattened portion 50c on one side as best shown in FIGS. 4 and 5 of the drawings to hold the size of the housing to a minimum. The portions 50a and 50b are aligned along an axis centered in the boss like portion 50a and the rotor shaft 46 is disposed on this central axis through the housing 50. The end of the housing 50 remote from the bosslike portion 50a is initially open so that effectively the housing 50 is sort of a cup-shaped housing with a protrusion of reduced cross section 50a at the end thereof opposite the open end.

To support the rotor 46 and the gear train 47 in a unitary assembly which can readily be inserted within the housing 50, there are provided a front bearing plate 52 and a rear bearing plate 53 which are held in spaced parallel relationship by a plurality of spacer posts 54. The rotor shaft 46 is journaled in aligned bearing openings in bearing plates 52 and 53, which latter may be formed of brass or other suitable material. Also journaled in the bearing plates 52 and 53 is the output shaft 48. In addition, there are journaled in the bearing plates 52 and 53 shafts 56 and 57 which support suitable gears of the gear train 47. In order to hold these shafts 46, 48, 56 and 57 in their proper spaced parallel positions in the bearing plates 52 and 53, there are provided front and rear retainer plates 60 and 61, respectively. These retainer plates are provided with suitable openings to receive the ends of the spacer studs 54 which protrude slightly beyond the retainer plates 60 and 61. The ends of these studs are then staked so that the front and rear bearing plates 52 and 53 and the front and rear retaining plates 60 and 61 are held in spaced parallel relationship with the shafts 46, 48, 56 and 57 extending in spaced parallel relationship between the bearing plates 52 and 53.

As best shown in FIGS. 3 and 4 of the drawings, the rotor or armature 41 essentially comprises two disclike members 41a and 41b, each formed of a special magnet steel. Each of the disklike members 41a and 41b is identical and comprises a continuous or unbroken outer ring. Extending across each ring is a spider arrangement in the form of two parallel bars 41c. These bars 41c are notched opposite each other at the center so as to provide a circular opening for receiving the rotor shaft 46. It will be apparent that the armature disks 41a and 41b can be made by a simple stamping operation and the two cross bars 41c can be sprung apart slightly and slipped over the shaft 46. Thus, the two cross bars 41c act as springs firmly to grasp the rotor shaft 46. It will be appreciated that the torque of this type of motor is very small and the elastic clamping action thus obtained between the disks 41a and 41b and the shaft 46 is ample to convey the torque to the rotor shaft without slipping.

In accordance with the present invention, the two disks 41a and 41b defining the armature 41 are displaced angularly, as is clearly shown in FIG. 4 of the drawings. In a particular embodiment constructed in accordance with the present invention, the angular displacement was thirty-five degrees. This angle is carefully selected to give a good balance between high starting torque and high running torque. Maximum starting torque is obtained when the rotors 41a and 41b or the spiders 41c thereof are displaced forty-five degrees relative to each other. Maximum running torque is obtained when the rotors 41a and 41b are in the same angular position. The selected angle of thirty-five degrees with relatively small tolerances permitted is fairly critical for best operation.

For the purpose of reducing the 3600 revolutions per minute of the rotor shaft 46 to an output of between one and thirty revolutions per minute of the output shaft 48, the gear train mechanism 47 comprises a rotor shaft pinion gear 70 which drivingly engages a spur gear 71 secured to the shaft 56. Preferably, the pinion 70 is substantially wider than the gear 71 to insure driving engagement even with some axial movement of the rotor shaft 46 so that the latter may center itself in the magnetic field between the pole faces 38 and 39. Moreover, to permit such axial movement, the front retainer plate 60 is provided with a protuberance 60a which defines an additional chamber into which the rotor shaft 46 may move in permitting the rotor 41 to align itself properly in the magnetic field of the core structure 37. In a particular embodiment built in accordance with the present invention the pinion gear 70 on the rotor shaft 46 was provided with ten teeth, while the gear 71 on the shaft 56 was provided with forty-eight teeth, whereupon the 3600 revolutions per minute of the rotor shaft 46 are reduced to 750 revolutions per minute of the shaft 56. Also secured to the shaft 56 is a pinion 72 which drivingly engages the gear portion 73a of a combined gear and pinion 73, preferably formed of nylon and having an integral pinion portion 73b. The gear 73 is freely rotatable on the output shaft 48. The pinion portion 73b of the gear 73 is in turn drivingly engaged with a gear 75 fixed to the shaft 57. Also fixed to the shaft 57 is a pinion gear 76 which drivingly engages a gear 77 fixed to the output shaft 48. In an embodiment built in accordance with the present invention the pinion gear 72, the pinion portion 73a of the gear 73, and the pinion gear 76 were all provided with nine teeth, while the gear portion 73a of the nylon gear 73 was provided with forty-five teeth, as were also the gears 75 and 77. With this arrangement the output shaft 48, by virtue of the gear train 47, was rotated at six revolutions per minute when the rotary shaft 46 was rotated at 3600 revolutions per minute.

In synchronous motors of the type described above the air gap between the rotor and the field structure has heretofore been of the order of forty to sixty thousandths of an inch. In accordance with the present invention the air gap can be reduced to between twelve and twenty thousandths of an inch, thus permitting a substantial reduction in the size of the field coil and field laminations without any reduction in torque. In order to obtain this smaller air gap it is important that the rotor 41 be accurately positioned in the housing 50, and of course that the housing 50 be accurately positioned in the opening 40 in the field structure 37. The positioning of the portion 50a of the housing 50 in the circular opening 40 between the pole faces of the magnetic structure 37 is simple, since a relatively snug fit is provided. However, to insure accurate positioning of the rotor 41 concentrically of the bosslike housing portion 50a, the open end of the housing 50a is provided with an accurately defined shoulder 80 (FIG. 3) which may be produced by swaging the peripheral portion of the open end of the housing to reduce the thickness thereof. This accurately defined shoulder 80 is then adapted to be engaged by the front bearing plate 52 which is shaped to snugly fit into this swaged portion of the housing 50b defining the shoulder 80. With the bearing plate 52 engaging the shoulder 80 all around the open end of the housing 50, assurance is had that the rotor 41 is accurately centered within the portion 50a of the housing 50 and, consequently, within the opening 40 in the magnetic structure.

In order to seal the housing 50 against the entrance of moisture or foreign matter, the open end of the housing is crimped as indicated at 81 to provide a lip overlying the front retainer plate 60. This crimped portion 81 of the housing thus holds the assembly comprising the plates 52, 53, 60, 61 and the posts 54 with the associated shafts and gear train therebetween accurately positioned within housing 50 as determined by the shoulder 80. To provide a complete seal, a suitable adhesive cement may be provided around the crimped portion 81. In a device built in accordance with the present invention a cement or sealer sold by the Minnesota Mining and Manufacturing Company as Sealer EC-1004 was found to be very satisfactory.

It will be apparent that except for the output shaft 48 protruding through the front retainer plate 60, the casing 50 is completely sealed. In order that a desirable seal is also provided around output shaft 48, there preferably is provided a suitable output shaft bushing 83 which is supported in the bearing plate 52 and front retainer plate 60. This bushing 83 extends outside the housing 50 so that it may be used accurately to locate the housing 50 relative to a mechanism to be driven from the output shaft 48 and specifically the gear 49.

For the purpose of providing satisfactory lubricant for the gear train 47, a small amount of a suitable oil or lubricant is placed within the housing 50 before the sealing operation described above. It will be understood that this oil may move into any part of the casing 50 during shipping or the like. It is necessary to provide means which will insure that this oil does not remain in the portion 50a of the housing 50 after the motor is installed in a suitable mechanism such as a clock and the motor is energized to operate such clock, since otherwise this oil would provide too much of a drag on the rotor 41. To accomplish this function, there is provided a felt pad or oil retainer 85 which is shaped somewhat in the form of a felt ring having a flattened edge on one side to conform with the flattened portion 50c of the housing section 50b. This felt ring is disposed between the section of the housing 50 connecting the portions 50a and 50b and the back retaining plate 61. When the motor is in the operative position, which is the position with the shaft 46 horizontal, the felt pad removes by capillary action any oil which may have moved into the housing section 50a, and returns this oil to the main housing section 50b in which the gear train 47 is disposed.

It should be understood that the motor 30 may have numerous applications but is particularly useful for furnishing the power to drive the gear train mechanism of a conventional electric clock. The operation of the motor 30 will readily be understood by those skilled in the art in view of the detailed description included above. When alternating current is supplied to the winding 35, it will be appreciated that a rotating flux will be produced in the armature 41 causing rotation of the armature and rotation of the output shaft 48 and the output gear 49. Such a motor is a self-starting synchronous motor which will provide a constant speed drive at the output gear 49. The gear train mechanism 47 described above is substantially less complicated than prior art devices. In the first place it only employs four stations or gear shafts, namely, 46, 48, 56 and 57, whereas prior art devices generally employ six stations or gear shafts. This is accomplished by utilizing the nylon gear 73 having portions 73a and 73b rotatable about the output shaft 48. Moreover, by employing a nylon gear such as 73 a greater gear reduction is obtained in a single stage than is possible with the conventional stamped gears.

In order that the electric motor 30 whose output gear 49 rotates at a relatively low speed, such as six revolutions per minute, may drive the sweep second hand 24, the minute hand 25, and the hour hand 26, it is apparent that a suitable gear train mechanism such as generally indicated at 29 must be interposed between the electric motor 30 and these hands 24, 25, and 26. Consequently, before indicating how the motor 30 is supported in the clock 20, a brief description of the interposed gear mechanism 29 or at least the means for supporting the same is included herewith. As in connection with the gear train 47 associated with the electric motor 30, it is desirable to have a pair of spaced supporting plates wherein the various shafts supporting different gears may be journaled or otherwise supported. Since there is already provided a front plate 28 which can be used for one of the supporting plates, there is provided a clock movement gear mechanism back plate 90 (FIGS. 2, 3, 5, 6 and 8) which is supported in spaced parallel relationship with respect to the front plate 28 by a plurality of spacer posts 91, three such spacer posts being employed in one embodiment built in accordance with the present invention. Preferably these spacer posts are provided with end portions of reduced cross section which extend through openings in the plates 28 and 90, respectively, which may be staked or otherwise deformed so as to hold the plates in spaced parallel relationship. The back plate 90 for the clock gear train 29 is provided with suitable openings 92 and 93 to accommodate the protuberance 60a of the clock housing and the bushing 83, respectively. Actually, the opening 93 is designed snugly to receive the projecting portion of bushing 83 so that when the latter is received in opening 93 it will accurately position the electric motor 30 relative to the back plate 90 of the clock movement, including the gear train 29. The electric motor 30 may be secured in any suitable manner to the plate 90. As illustrated, a pair of spacer studs 94 (FIGS. 2, 5 and 6) and 95 (FIGS. 3 and 5) are employed. These spacer studs may preferably comprise one end of reduced cross section which is inserted in suitable spaced openings in plate 90 and staked or otherwise secured to plate 90 in spaced parallel relationship. The other ends preferably each include a tapped opening for receiving suitable fastening means 96, which fastening means pass through suitable openings defined in the magnetic structure 37 of the motor 30. It will thus be apparent that when the fastening means 96 are in place, as indicated in FIGS. 2 and 3 of the drawings, they will clamp the magnetic structure against the spacer studs 94 and 95. Since the portion 50a of the housing 50 is inserted in the opening defined between the pole faces and the bushing 83 is disposed in the opening 93 in the plate 90, the entire motor is firmly supported as shown in FIG. 2, in a manner which permits ready assembly or replacement and insures accurate positioning thereof with respect to the plate 90.

It will be understood that in any electric clock having a sweep second hand it is necessary to provide means for moving the sweep second hand at one revolution per minute. As best shown in FIGS. 3, 7 and 8, there is provided a sweep second shaft 99 which protrudes through the front plate 28 and to the front end of which is secured the sweep second hand 24. This sweep second shaft 99, as will become apparent from the following description, is one of a series of concentric shafts and is effectively the innermost of these concentric shafts, all others of which are tubular in form. This shaft 99 is suitably journaled in the back plate 90 and effectively also in the front plate 28 within the tubular concentric shafts, the outermost of which is journaled in front plate 28 as described in greater detail hereinafter. For the purpose of rotating shaft 99 at one revolution per minute, there is secured to the end of the sweep second shaft 99 remote from the sweep second hand 24, and between the plates 28 and 90, a sweep second gear and pinion assembly comprising a gear 100 and a pinion 101. The gear 100 is disposed to be drivingly engaged by the output gear 49 of the motor 30. In an embodiment built in accordance with the present invention the gear 100 was provided with forty-eight teeth to mesh with an output gear 49 having eight teeth, which latter gear rotated at six revolutions per minute. It is quite obvious that with this arrangement the sweep second shaft 99 would rotate at one revolution per minute as required of the sweep second hand 24 secured thereto.

For the purpose of driving the minute hand 25 at one revolution per hour, it is apparent that there must be provided a sixty to one reduction between the speed of rotation of sweep second pinion 101 and a suitable minute shaft. To this end there is provided a minute sleeve or tubular shaft 104 concentric with the sweep second shaft 99. This minute shaft 104 has a portion of reduced cross section projecting beyond the clock face side of supporting plate 28, as best shown in FIGS. 3 and 7 of the drawings, for supporting thereon the minute hand 25.

Preferably the various hands are provided with frictional means so that they may be merely pressed onto the ends of their respective shafts and they will remain in this position.

It will be appreciated that it is necessary to be able to set the hands of a clock when the electric clock is first connected to a source of electric power, and occasionally at other times in the case of power outages or the like. It is not desirable to reset the sweep second hand which is directly connected to the motor 30. Consequently, some clutch arrangement should be provided which permits resetting, for example, of the minute and hour hands of the clock without actuating the entire mechanism, including the electric motor 30. To this end there is secured to the minute sleeve 104 a minute pinion 106. Additionally, a minute gear 107 is supported on an extension of reduced cross section on the pinion 106. A spring friction member 108 is provided, which is secured to the pinion 106 so as to press against one face of the gear 107. As illustrated, the gear 107 is indicated as of dished construction, and the friction spring 108 engages the face of the gear within the depression defined by the dished construction. It will be apparent that normally the friction washer 108 will cause the pinion 106 and the gear 107 to rotate as a unit with the minute shaft 104. However, if the gear 107 is prevented from rotating as by driving engagement with the motor output gear 49, it is still possible manually to rotate the minute sleeve or tubular shaft 104 and the pinion 106, which will occur by virtue of slippage between the gear 107 and the friction spring 108.

As illustrated, the gear 107 is adapted to be driven from the second hand shaft 99 through a gear and pinion assembly comprising a pinion 105 and a gear 109 rotatably mounted on an intermediate shaft 110 suitably supported within the front plate 28 and back plate 90. The gear 109 meshes with the pinion 101 of the sweep second shaft assembly and the pinion 105 drivingly engages the gear 107. In an embodiment built in accordance with the present invention the pinion 101 was provided with eight teeth, the gear 109 with sixty-four teeth, the pinion 105 with eight teeth, and the gear 107 with sixty teeth. With this arrangement the pinion 105 was rotated at one-eighth of a revolution per minute and, consequently, the minute sleeve or tubular shaft 104 was rotated at one revolution per hour. It should be understood that the particular gear ratios described are those which have been embodied in a device built in accordance with the present invention. Obviously, these gear ratios could be varied so long as the minute sleeve 104 was driven at one revolution per hour from the sweep second shaft 99 which rotates at one revolution per minute.

In order to actuate the hour hand 26 at one revolution during each twenty-four-hour period, there is provided an hour sleeve or tubular hour shaft 112 surrounding the minute sleeve 104 and, of course, concentric with the sweep second shaft 99. This hour sleeve also projects beyond the clock face side of the front plate 28 and has secured thereto the hour hand 26. Preferably, the end projecting beyond the clock face is of reduced cross section so as to permit the hour hand to be secured thereto by frictional engagement. Secured to the other end of the hour sleeve 112 is an hour gear 113, which, in accordance with the present invention, performs a dual function of combined hour gear and alarm cam, as will be described in greater detail hereinafter. Considering first its function for driving the hour sleeve 112 at one revolution during each twelve-hour period, the hour gear 113 is adapted to engage a pinion 114 and connected gear 115 secured to the intermediate shaft 110 and rotatable therewith. Actually the pinion 114 and gear 115 might be freely rotatable about the shaft 110. The gear 115 is driven by the pinion 106 from the minute sleeve assembly while the pinion 114 engages the hour gear 113, which also functions as a female cam gear. In an embodiment built in accordance with the present invention the hour gear 113 was provided with fifty-six teeth, the pinion 114 with fourteen teeth, the intermediate gear 115 with fifty-four teeth, and the pinion 106 with eighteen teeth. This means that with the pinion 106 rotating one revolution per hour, the combined pinion 114 and the gear 115 rotate one-third of a revolution per hour, with the result that the hour gear 113 rotates one-twelfth of a revolution an hour or one revolution every twelve hours.

To perform an alarm controlling function, the hour gear 113 and its associated tubular shaft 112 are axially movable to a limited extent between the two positions shown in FIGS. 12 and 13 of the drawings. To this end, the pinion 114 is elongated so as to insure constant driving engagement between it and hour gear 113 at all times. The hour gear 113 is preferably staked to the hour sleeve or tubular hour shaft 112.

The outermost of the series of tubular shafts designated at 118 in the drawings is the alarm shaft or alarm sleeve. This alarm sleeve or shaft 118 also projects through the front plate 28 and has secured thereto the hand 27 which indicates the setting of the alarm gear which selectively controls when the alarm is to be actuated. As illustrated, the alarm sleeve 118 is provided on the end thereof protruding beyond the clock face 23 with an annular groove 119 to receive the alarm indicator 27. Secured to the alarm shaft or sleeve 118 between the front plate 28 and the female hour gear 113 is an alarm cam gear 120. Preferably, the gear 120 is a molded nylon gear and is suitably secured to the sleeve 118 as by means of a backing washer 121. The face of the alarm cam gear 120 adjacent the hour gear 113 is provided with a pair of laterally projecting cam members 120a and 120b which are molded integrally with the nylon gear 120. These cam members 120a and 120b are positioned diametrically opposite each other, but to insure operation thereof only once during each twelve-hour period the distance from the common axis of the concentric shafts 99, 104, 112 and 118 is greater for projection 120b than for projection 120a. These projections 120a and 120b extend for a short distance in a circumferential direction with respect to gear 120 and are adapted to cooperate with a plurality of openings 113a and 113b defined in the hour gear 113. When the cam members 120a and 120b are aligned with the openings 113a and 113b, respectively, the tubular hour shaft 112 and associated gear 113 may move to the left as viewed in FIGS. 3 and 7 of the drawings, so that the cam members 120a and 120b enter the openings 113a and 113b. The opening 113b, like its co-operating projection 120b, is also further from the axis of shaft 99 than opening 113a.

In order that the alarm gear and cam 120 and its associated tubular shaft 118 remain in a predetermined position unless positively moved to a different position, there is provided an alarm friction gear 125 which is journaled on a suitable tubular stud 126 secured to the front plate 28, as best shown in FIG. 3 of the drawings. This friction gear 125 is drivingly engaged with the alarm gear 120. A suitable spring member 127 interposed between the front supporting plate 28 and the friction gear 125 provides a frictional drag on the gear 125 so that it will remain at whatever setting it is placed. Since it is in driving engagement with the alarm gear 120, this, of course, means that the alarm gear 120 remains positioned in whatever position it is originally placed. It will be appreciated that the alarm gear may be selectively positioned at any place and the friction gear 125 will hold it in this position despite the fact that various concentric shafts which it surrounds are continuously rotating.

In order readily to adjust and selectively set the alarm gear 120 and associated cams for any particular setting, there is provided a combined time and alarm setting shaft 128 which is mounted in an elongated bearing 129 suitably supported in back plate 90. This alarm setting shaft, which, as will become apparent from the ensuing description, also serves as a time setting shaft, is mounted for both rotatable and axial movement in the elongated bearing 129. To the end of the shaft 128 which is disposed between the front and back plates 28 and 90, respectively, is secured a suitable gear 130. In the position indicated in solid lines in FIG. 3 of the drawings, this gear 130 is drivingly engaged with the friction gear 125. The end of the shaft 128 is illustrated as extending into a suitable opening 131 defined in the front plate 28. The other end of the shaft 128 extends through a suitable opening 134 in the clock rear cover plate 31 and has secured thereto a suitable knob 135.

When it is desired to set the time on the clock 20, a knob 135 is pulled outwardly or toward the right, as viewed in FIG. 3 of the drawings, until gear 130 is in the dotted line position shown in FIGS. 3 and 7 of the drawings. In that position the gear 130 is in driving engagement with the gear 115, and by virtue of engagement with the pinion 106 of the minute gear assembly and through pinion 114 being in driving engagement with the hour gear and cam 113, the entire clock mechanism can be adjusted to any selected position. Such setting does not interfere with the position of the second shaft 99 by virtue of the slip clutch arrangement comprising the spring 108 and the minute gear 107. Thus it will be appreciated that there has been provided a single set shaft for setting both the alarm and also the time. When the electric clock is initially connected to a suitable electrical outlet, the knob 135 is pulled or moved to the right, as viewed in FIGS. 3 and 7 of the drawings, to set the clock to the correct time. Thereafter the knob 135 is moved to the position indicated in solid lines in FIGS. 3 and 7 of the drawings, and rotation thereof in these positions will give any selected setting of the alarm mechanism to be described hereinafter.

For the purpose of providing an audible signal, any suitable buzzer mechanism may be provided. Preferably and as illustrated in the drawings, the magnetic field already available by virtue of the magnetic structure 37 of the motor 30 is employed as the actuating source of such a buzzer or audible signal device. To this end there is provided a vibrator generally designated at 140, as best shown in FIG. 2 of the drawings, but also visible, at least in part, in FIGS. 5, 12, 13 and 15 of the drawings. As best shown in FIG. 2, this vibrator comprises a supporting portion 140a which is preferably riveted or otherwise secured as indicated at 141 to the plate 90. Projecting from the portion 140a and integrally connected thereto is an elongated spring vibrator arm 140b, the free end of which extends over the leg of the magnetic structure 37 upon which the winding 35 is supported. Preferably, this leg of the magnetic structure 37 is provided with an extension 37b comprising some slightly longer laminations which are disposed immediately beneath the free end of the vibrator arm 140b. It will be appreciated that when the free end of the vibrator arm 140b is permitted to be disposed relatively close to the ends of the lamination extensions 37b and the winding 35 is energized, it will be caused to vibrate under the electrical impulses of the flux produced by the windings, and the free end of the vibrator will vibrate back and forth striking the lamination extension 37a to produce an audible signal.

For the purpose of controlling the audible signal produced by the vibrator 140 and specifically the arm portion 140b thereof, there is provided an alarm lever 145, best shown in FIGS. 12, 13 and 14 of the drawings. This alarm lever 145 comprises a major portion thereof disposed substantially in a vertical plane the lower end of which terminates in a forked portion 145a defining a slot 146. This slot 146 is adapted to receive therein the tubular minute shaft or sleeve 104, as best shown in FIGS. 3, 12 and 13 of the drawings. Effectively, the alarm lever 145 is pivotally mounted about its midpoint so that the forked end 145a may be disposed in either of the two positions shown in FIGS. 12 and 13 of the drawings. As illustrated in these two figures, the front plate 28 of the clock 20 is provided with an integral portion 28a which is bent rearwardly and includes a slot 148 therein to receive the alarm lever 145 with the lower slot 146 receiving the minute sleeve or shaft therein. In order to bias the alarm lever 145 in the direction and toward the dotted position shown in FIG. 12 of the drawings, which tends to move the combined hour gear and female cam member 113 toward the alarm cam 120, there is provided a suitable spring 149 which is secured to the front plate 28 as by means of a suitable rivet 150. The other end of the spring 149 is indicated as engaging the lever 145 immediately above an integral projection 145b of lever 145. The alarm lever 145 is provided with a lateral projection 145c clearly shown in FIGS. 12, 13 and 14, which extends substantially at right angles to the main portion of the vertically disposed lever 145 and with the free end thereof disposed beneath the vibrator arm 140. When the lever 145 is in the positions shown in FIGS. 12 and 13 of the drawings, the projection 145c engages the bottom of the vibrator arm 140 and prevents the vibrator from vibrating to produce an audible signal. FIG. 13 shows this position of the arm 145c by virtue of a manual shut-off mechanism which holds the lever in this position regardless of the axial position of the hour gear 113. FIG. 12 shows this same position of the lever 145 and the portion 145c thereof, which renders the vibrator 149 inoperative, but not by virtue of any manual shut-off mechanism, but by virtue of the fact that the selected position of alarm gear 120 is such as to prevent the alarm lever 145 to move to a position which will permit actuation of the alarm. That simply means that the alarm setting has not been reached, but when the setting is reached the alarm will be actuated.

If desired, alarm lever 145 may control a set of electrical contacts whereby the alarm mechanism may be used to control any desired electrical circuit. For the purpose of controlling manually the on or off position of the alarm lever 145, there is provided, as best shown in FIGS. 2, 12 and 12 of the drawings, a manually actuatable shut-off member 152 which is disposed for movement along a horizontal axis by virtue of suitable supporting means associated with the clock. This member 152 is adapted to engage an extension 145d of the lever 145. As best illustrated in FIG. 2, an alarm shut-off guide member 154 is supported from the magnet structure 37 of the motor 30 by one of the fastening means 96. This member is provided with a slot 155 slidably to receive the shut-off member 152. The other end of the shut-off member 152 is adapted to extend through a suitable slot 156 provided in the rear supporting plate 90 of the clock gear mechanism 29. The end of the shut-off rod or member 152 is provided with a manually actuatable extension 152a which is adapted to extend beyond the back 31 of the clock so that it can be manipulated by the operator to either the on or the off position. In FIG. 13 of the drawings the manual shut-off member 152 is shown in the shut-off position, while in FIG. 12 it is shown in the alarm on position.

In order to hold this manual shut-off member 152 in either of the positions shown in FIGS. 12 and 13, there is preferably provided a spring detent member 157 which is adapted to engage with either one of a pair of notches 158a or 158b defined along one edge of the member 152. The notch 158b is the alarm off notch, and the shut-off member 152 is shown in this alarm off position in FIG. 2 of the drawings.

The operation of the alarm mechanism when the shut-off member 152 is in the alarm on position, as indicated in FIG. 12 of the drawings, can best be understood by reference to FIGS. 9, 10, 11 and 12 of the drawings. It will be apparent that the alarm gear and cam 120 will normally be in a stationary position as determined by the selective alarm setting. The hour gear 113 will rotate in the direction of the arrows in FIGS. 10 and 11 of the drawings relative to the cam gear 120 at one revolution during each twelve-hour period. As long as the cam portions 120a and 120b are out of engagement with the cooperating openings 113a and 113b in the hour gear 113, the latter is held in the solid line position of FIG. 12, which causes the alarm lever 145 to be held in the solid line position there shown with the result that the vibrator 140 is rendered inoperative to produce an audible signal. As the hour gear 113 approaches the selected time setting of the alarm as determined by the position of the alarm gear 120, the cam projections 120a and 120b enter the openings 113a and 113b, and when they do, the spring 149 biases the alarm lever 145 and consequently the hour gear 113 toward the alarm cam 120 to the position shown in dotted lines in FIG. 12 and the solid lines of FIG. 13 of the drawings. This can occur only once during each twelve-hour period, since the projection 120a on gear 120 and the corresponding opening 113a on gear 113 are closer to the central axis of these gears than are the corresponding projection 120b and opening 113b, as clearly shown in FIG. 10 of the drawings. Thus, only once during each twelve-hour period can the hour gear 113 move toward the alarm cam 120 so that the projections 120a and 120b mesh within the cooperating openings 113a and 113b, respectively. In this position, if the shut-off member 152 is in the position shown in FIG. 12 of the drawings, the audible signal will be actuated.

It will be apparent that upon continued rotation of the hour gear 113 from the position shown in FIG. 13 of the drawings, relative to the alarm cam 120, the gentle slope on the trailing side of the projection 120a will cause the hour gear 113 to gradually move away from the alarm cam 120. Preferably, the trailing edge of the openings 113a and 113b is provided with a slight lateral projection 113c which rides up the inclined surface of the projection 120a to insure smoother operation of the relative separation of the gears 113 and 120.

With the arrangement described above, the construction is what is commonly termed in the trade as a "rear shut-off" device, meaning that the shut-off member 152 is actuated from the rear of the clock. In some instances it is desirable to have what is known as a "top shut-off," and with the disclosure of the present invention such a shut-off mechanism can readily be had employing the identical mechanism including the identical alarm lever 145. In FIGS. 15 and 16 of the drawings there is shown how simple it is to provide a top shut-off for the alarm mechanism. The corresponding parts of FIG. 15 are designated by the same reference numerals as in the preceding embodiments. Actually, the only change made is that the detent 157, the manual shut-off member 152 and the guide 154 are dispensed with and in their place there is employed a vertically movable shut-off member 160 and a guide member 161. In addition, the alarm lever spring 149 is replaced by a spring 162 which, however, functions like the spring 149. As illustrated, the guide 161 includes a projection 161a which is secured to the supporting plate 28 by a suitable rivet 163. The spring 162 is also secured to this plate 28 by rivet 163. The guide 161 also includes a U-shaped portion 161b provided with vertically aligned openings to receive the manual top shut-off member 160. The upper arm of the U-shaped portion 161b of the member 161 is provided with a pair of downwardly projecting integral fingers 161c, as best shown in FIG. 16, which limit the upward movement of the member 160. The lower end of the shut-off lever 160 is conical, as indicated at 160a, which upon downward movement thereof engages an angular projection 145e of the shut-off alarm lever 145 and actuates it in exactly the same manner as does the shut-off member 152 heretofore described which engages the projection 145d of the same lever.

In view of the detailed description included above, the operation of the electric clock of the present invention, the alarm mechanism and the like will readily be understood by those skilled in the art. It will be appreciated that there has been provided a very simple and inexpensive electric clock mechanism including a simple alarm attachment which is adapted for either top or back shut-off. Additionally, there has been provided a simple mechanism for setting the alarm as well as the time device of the clock; and by causing various elements to perform dual functions, a simplified gear and cam arrangement is obtained.

While there have been illustrated and described several embodiments of the present invention, it will be understood that various changes and modifications may occur to those skilled in the art. It is intended in the appended claims to cover all those changes and modifications which fall within the true spirit and scope of the present invention.

What is claimed as new and desired to be secured by Letters Patent of the United States is:

1. A synchronous electric clock motor comprising an oil-tight housing having a bosslike projection at one end thereof, a pair of spaced parallel plates supported in said housing, one of said plates being positioned near the end of said housing from which said bosslike projection extends but spaced slightly therefrom to define a narrow capillary space between said one plate and said end of said housing, a gear mechanism included between said plates, an armature disposed within said projection and drivingly connected to said gear mechanism, a field structure associated with said armature, and a porous member disposed in said capillary space to convey oil which may have moved into said bosslike projection back to the portion of said housing containing said gear mechanism.

2. An electric motor comprising an oil-tight housing having a bosslike projection at one end thereof, said oil-tight housing being defined by a somewhat cup-shaped member open at the end remote from said end having said bosslike projection and a closure plate for said open end, means defining a peripheral shoulder on the inside of said cup-shaped member near the open end thereof, a gear mechanism including a pair of spaced plates for supporting said gear mechanism therebetween, a motor armature drivingly connected to said gear mechanism and forming with said gear mechanism a unit of assembly, said shoulder engaging one of said plates to support said gear mechanism in said housing with said armature accurately concentric in said bosslike projection, and a field structure including pole faces adjacent said armature.

3. The motor of claim 2 wherein the effective air gap between said armature and pole faces is within the range of twelve to twenty thousandths of an inch.

4. A synchronous electric motor comprising an oil-tight housing having a bosslike projection at one end thereof, said oil-tight housing comprising a somewhat cup-shaped member open at the end remote from said end having said bosslike projection and a closure plate for said open end, means defining a peripheral shoulder on the inside of said cup-shaped member near the open end thereof, a gear mechanism including a pair of spaced plates for supporting said gear mechanism therebetween, a motor armature drivingly connected to said gear mechanism and forming said gear mechanism a unit of assembly, said shoulder engaging one of said plates to support said gear mechanism in said housing with said armature accurately concentric in said bosslike projection, and means comprising a deformation of the open end of said cup-shaped member to provide a seal for said oil-tight housing.

5. The motor of claim 4 wherein the last mentioned means includes an adhesive cement.

6. A synchronous electric clock motor comprising a magnetic field structure comprising a pair of pole faces arranged to define a circular opening, an oil-tight housing having a bosslike projection at one end thereof, said projection being snugly disposed in said opening and concentric therewith, said oil-tight housing comprising a somewhat cup-shaped member open at the end remote from said end having said bosslike projection and a closure plate for said open end, means defining a peripheral shoulder on the inside of said cup-shaped member near the open end thereof, a gear mechanism including a pair of spaced plates for supporting said gear mechanism therebetween, and a motor armature drivingly connected to said gear mechanism and forming with said gear mechanism a unit of assembly, said shoulder engaging one of said plates to support said gear mechanism in said housing with said armature in said bosslike projection and accurately concentric therewith.

7. A synchronous electric clock motor comprising an oil-tight housing having a bosslike projection at one end thereof, said oil-tight housing being defined by a somewhat cup-shaped member open at the end remote from said end having said bosslike projection and a closure plate for said open end, means defining a peripheral shoulder on the inside of said cup-shaped member near the open end thereof, a pair of spaced parallel plates including means for supporting said plates as a unit, said pair of plates being disposed in said cup-shaped member with one of said plates resting on said shoulder, the other of said plates being then positioned near the end of said housing from which said bosslike projection extends to define a narrow capillary space between the other of said plates and said end of said housing, a gear mechanism included between said plates, an armature disposed within said projection and drivingly connected to said gear mechanism, a field structure associated with said armature, and a porous member disposed in said capillary space to convey oil which may have moved into said bosslike projection back to the portion of said housing containing said gear mechanism.

8. A synchronous electric clock motor comprising an oil-tight housing having a bosslike projection at one end thereof, said oil-tight housing being defined by a somewhat cup-shaped member open at the end remote from said end having said bosslike projection and a closure plate for said open end, means defining a peripheral shoulder on the inside of said cup-shaped member near the open end thereof, a pair of spaced parallel plates including means for supporting said plates as a unit, said pair of plates being disposed in said cup-shaped member with one of said plates resting on said shoulder, the other of said plates being then positioned near the end of said housing from which said bosslike projection extends to define a narrow capillary space between the other of said plates and said end of said housing, a gear mechanism included between said plates comprising only four shafts journaled in said plates, one of said shafts extending into said projection, an armature disposed within said projection and drivingly secured to said one shaft, a field structure associated with said armature, and a porous member disposed in said capillary space to convey oil which may have moved into said bosslike projection back to the portion of said housing containing said gear mechanism.

9. A self-starting synchronous motor comprising a magnetic field structure defining a pair of opposed pole faces, an armature mounted for rotation between said pole faces, said armature comprising two axially displaced continuous rings of magnetic material each provided with an integral bar extending across a diameter of said rings, an armature shaft and means for securing said rings to said shaft at the center point of said integral bars, said bars of said two rings being angularly displaced by an angle of the order of thirty-five degrees.

10. The motor of claim 9 wherein the integral bar associated with each ring is longitudinally split.

11. The clock motor of claim 2 wherein said gear mechanism includes an armature shaft having one end thereof extending into said bosslike projection and secured to said armature, a boss provided on said closure plate concentric with said armature shaft whereby limited axial movement of said armature shaft to permit centering of said armature between said pole faces is permitted with the other end of said armature shaft receivable in said boss.

12. In a self-starting clock motor, a generally rectangular magnetic field structure comprising a pair of opposed pole faces defining a circular opening therein, an energizing winding on said magnetic structure, a cup-shaped housing open at one end including two sections of different size integrally joined in end-to-end relationship, the one of said sections at the closed end of said housing having a circular cross section of relatively small diameter receivable in said circular opening, the other of said sections being of generally circular cross section of larger diameter than said one section and having a flattened side adjacent said winding, said flattened side being parallel to the longitudinal axis of said winding and closely adjacent to said winding, an armature for said motor contained in the section of said housing receivable in said opening, a gear mechanism in said housing and driven by said armature, and means for closing the open end of said housing to define a sealed casing for said armature and gear mechanism.

References Cited in the file of this patent

UNITED STATES PATENTS

| | | |
|---|---|---|
| 985,693 | Olmsted | Feb. 28, 1911 |
| 1,456,082 | Warren | May 22, 1923 |
| 1,495,936 | Warren | May 27, 1924 |
| 1,502,491 | Treger | July 22, 1924 |
| 2,435,911 | Van Der Woude | Feb. 10, 1948 |
| 2,467,936 | Hummel | Apr. 19, 1949 |
| 2,607,186 | Schulze | Aug. 19, 1952 |
| 2,745,977 | Tesh | May 15, 1956 |
| 2,752,517 | Von Delden | June 26, 1956 |

FOREIGN PATENTS

| | | |
|---|---|---|
| 160,805 | Switzerland | Nov. 1, 1933 |
| 326,264 | Germany | Sept. 25, 1920 |